US011556356B1

(12) United States Patent
Li et al.

(10) Patent No.: US 11,556,356 B1
(45) Date of Patent: Jan. 17, 2023

(54) DYNAMIC LINK OBJECTS ACROSS DIFFERENT ADDRESSING MODES

(71) Applicant: International Business Machines Corporation, Armonk, NY (US)

(72) Inventors: Naijie Li, Beijing (CN); Jing Lu, Beijing (CN); Xiao Yan Tang, Beijing (CN); Ming Ran Liu, Beijing (CN); Yuan Zhai, Beijing (CN); Kershaw S. Mehta, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/483,776

(22) Filed: Sep. 23, 2021

(51) Int. Cl.
*G06F 9/445* (2018.01)
*G06F 9/54* (2006.01)
*G06F 8/41* (2018.01)

(52) U.S. Cl.
CPC ............ *G06F 9/44521* (2013.01); *G06F 8/41* (2013.01); *G06F 9/544* (2013.01)

(58) Field of Classification Search
CPC ......... G06F 9/44521; G06F 8/41; G06F 9/544
See application file for complete search history.

(56) References Cited

U.S. PATENT DOCUMENTS

| | | | | |
|---|---|---|---|---|
| 4,970,639 | A | * | 11/1990 | Diefendorf ........... G06F 9/4843 717/174 |
| 5,452,456 | A | | 9/1995 | Mourey |
| 5,724,585 | A | | 3/1998 | Hassitt |
| 5,784,638 | A | | 7/1998 | Goetz |
| 6,199,202 | B1 | | 3/2001 | Coutant |
| 7,171,543 | B1 | | 1/2007 | Ronen |
| 7,451,298 | B2 | | 11/2008 | Peak |
| 8,813,104 | B2 | | 8/2014 | Saborowski |
| 8,954,711 | B2 | * | 2/2015 | Stephens ............. G06F 9/30167 711/220 |
| 9,336,180 | B2 | | 5/2016 | Ebersole |
| 10,120,663 | B2 | * | 11/2018 | Hasabnis ................ G06F 8/433 |

(Continued)

FOREIGN PATENT DOCUMENTS

GB 2503590 B 5/2014

OTHER PUBLICATIONS

Anonymous, "Statically Linking Amode M and Amode N Programs" IP.com, Disclosure No. IPCOM000264320D, Dec. 2, 2020, 3 pages. <https://priorart.ip.com/IPCOM/000264320>.

(Continued)

*Primary Examiner* — Umut Onat
(74) *Attorney, Agent, or Firm* — Jared C. Chaney

(57) ABSTRACT

A call to an external interface to execute a target callee program associated with a first addressing mode in a secondary runtime environment (RTE) is received from a caller program associated with a second addressing mode running in a primary RTE. An address of a share area (SA) storing existing dynamic link object information in the primary RTE in storage is passed to the secondary RTE. The SA is accessible by both the caller program and the target callee program. In response to a request to load a dynamic link object by an initiating program during execution of the target callee program in the secondary RTE, an entry address of the dynamic link object is retrieved in the SA. The dynamic link object is loaded based on the retrieved entry address of the dynamic link object.

20 Claims, 12 Drawing Sheets

(56) References Cited

U.S. PATENT DOCUMENTS

| | | |
|---|---|---|
| 2004/0268319 A1 | 12/2004 | Tousignant |
| 2012/0233612 A1 | 9/2012 | Beckett |
| 2015/0277867 A1 | 10/2015 | Hasabnis |
| 2017/0228230 A1 | 8/2017 | Suchy |
| 2020/0192730 A1 | 6/2020 | Li |
| 2020/0326942 A1 | 10/2020 | Lu |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

DYNAMIC LINK OBJECTS ACROSS DIFFERENT ADDRESSING MODES

BACKGROUND

The present disclosure relates to dynamic link objects and addressing modes, and more specifically, to using dynamic link objects across different addressing modes.

A 64-bit processor architecture is capable of referencing a considerably larger memory space than a 32-bit processor architecture and is thus gradually replacing the 32-bit processor architecture. Accordingly, 64-bit operating system (O/S) and 64-bit computer programs, applications, or the like typically written for the 64-bit O/S, all of which are configured to run on a 64-bit processor, are prevailing over their 32-bit counterpart that is configured to run on a 32-bit processor, i.e. 32-bit O/S and corresponding 32-bit computer programs, applications, or the like.

SUMMARY

According to one embodiment of the present disclosure, there is provided a computer-implemented method. A call to an external interface to execute a target callee program in a secondary runtime environment is received from a caller program running in a primary runtime environment. The caller program is associated with a first addressing mode and the target callee program is associated with a second addressing mode that is different from the first addressing mode. An address of a share area (SA) storing existing dynamic link object information in the primary runtime environment in a storage of one of the caller program or the target callee program is passed to the secondary runtime environment. The SA is accessible by both the caller program and the target callee program. In response to a request to load a particular dynamic link object by an initiating program during execution of the target callee program in the secondary runtime environment, an entry address of the particular dynamic link object is retrieved in the SA based on the address of the SA. The particular dynamic link object is loaded based on the retrieved entry address of the particular dynamic link object.

According to one embodiment of the present disclosure, there is provided a computer-implemented method. A call to a dynamic link element exported from a dynamic link object is received from a caller program. The dynamic link object has been written in a first addressing mode and has been generated comprising the dynamic link element and a first exporting table indicating an address offset of the dynamic link element for the first addressing mode and a second exporting table indicating an address offset of the dynamic link element for a second addressing mode. An address offset of the dynamic link element is determined based on the first exporting table or the second exporting table depending on whether the caller program is associated with the first addressing mode or the second addressing mode. An importing address of the dynamic link element is calculated based on an entry address of the dynamic link object and the address offset of the dynamic link element. The particular dynamic link element is accessed via the importing address.

According to another embodiment of the present disclosure, there is provided a computer system. The computer system comprises a processor and a computer-readable memory coupled to the processor, the memory comprising instructions that when executed by the processor implement the methods as provided according to embodiments of the present disclosure.

According to another embodiment of the present disclosure, there is provided a computer program product. The computer program product comprises a computer readable storage medium having program instructions embodied therewith, the program instructions executable by a processor to cause the processor to implement the methods as provided according to embodiments of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
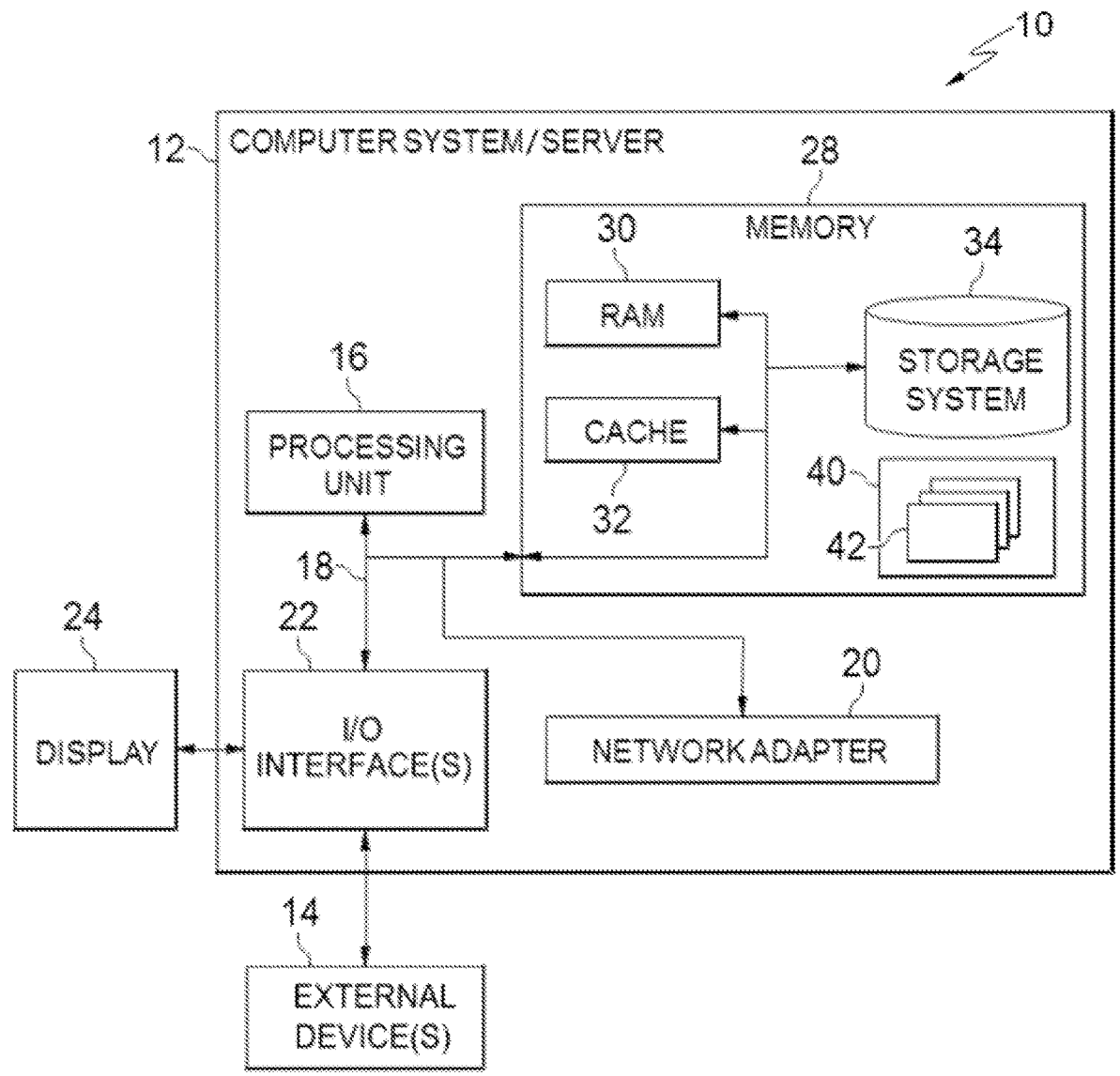
FIG. 1 depicts a cloud computing node according to an embodiment of the present disclosure.

Some embodiments will be described in more detail with reference to the accompanying drawings, in which the embodiments of the present disclosure have been illustrated.

However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

In some embodiments, the characteristics of the model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

In some embodiments, the Service Models may include:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

In some embodiments, the Deployment Models include:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
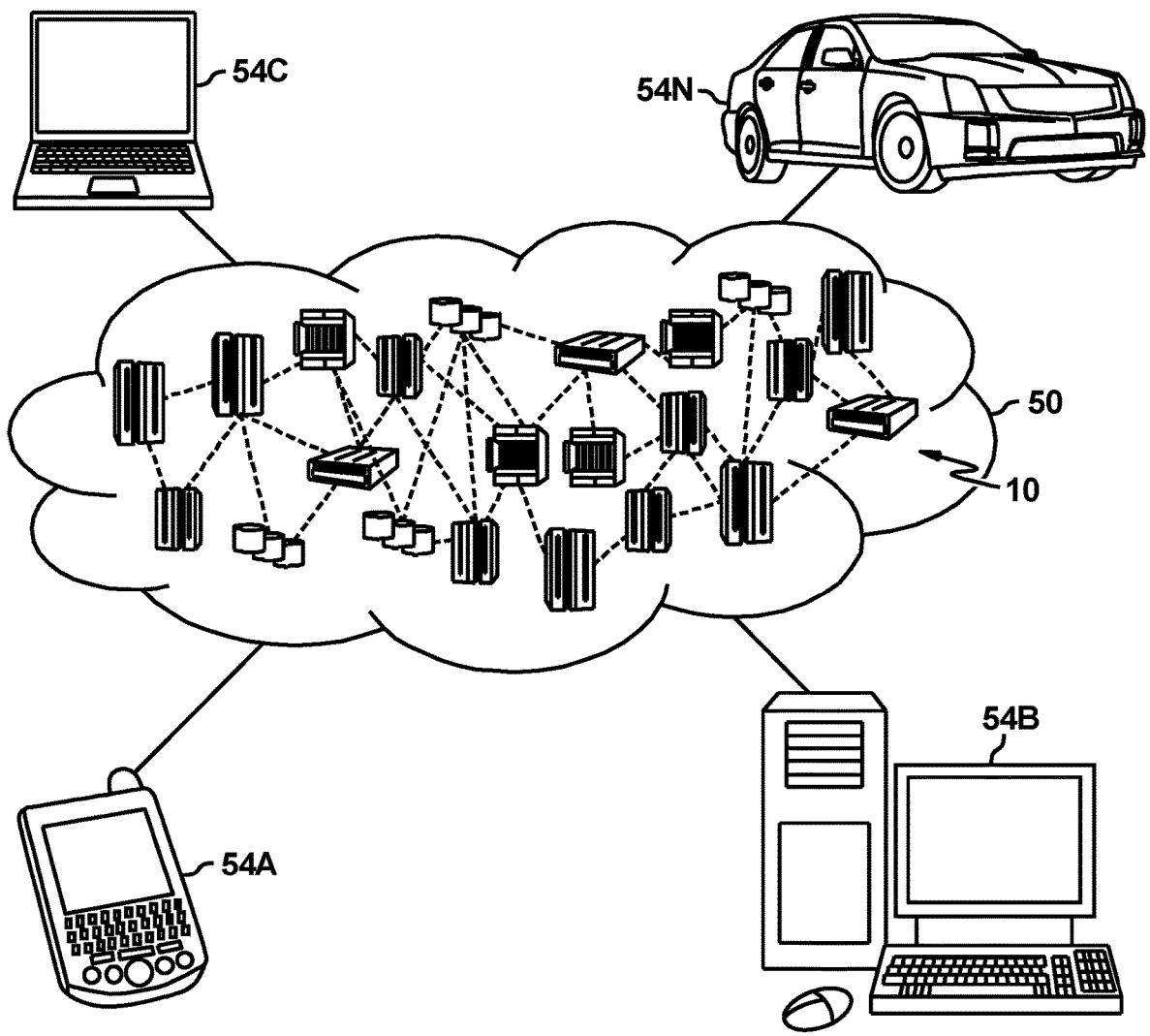
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
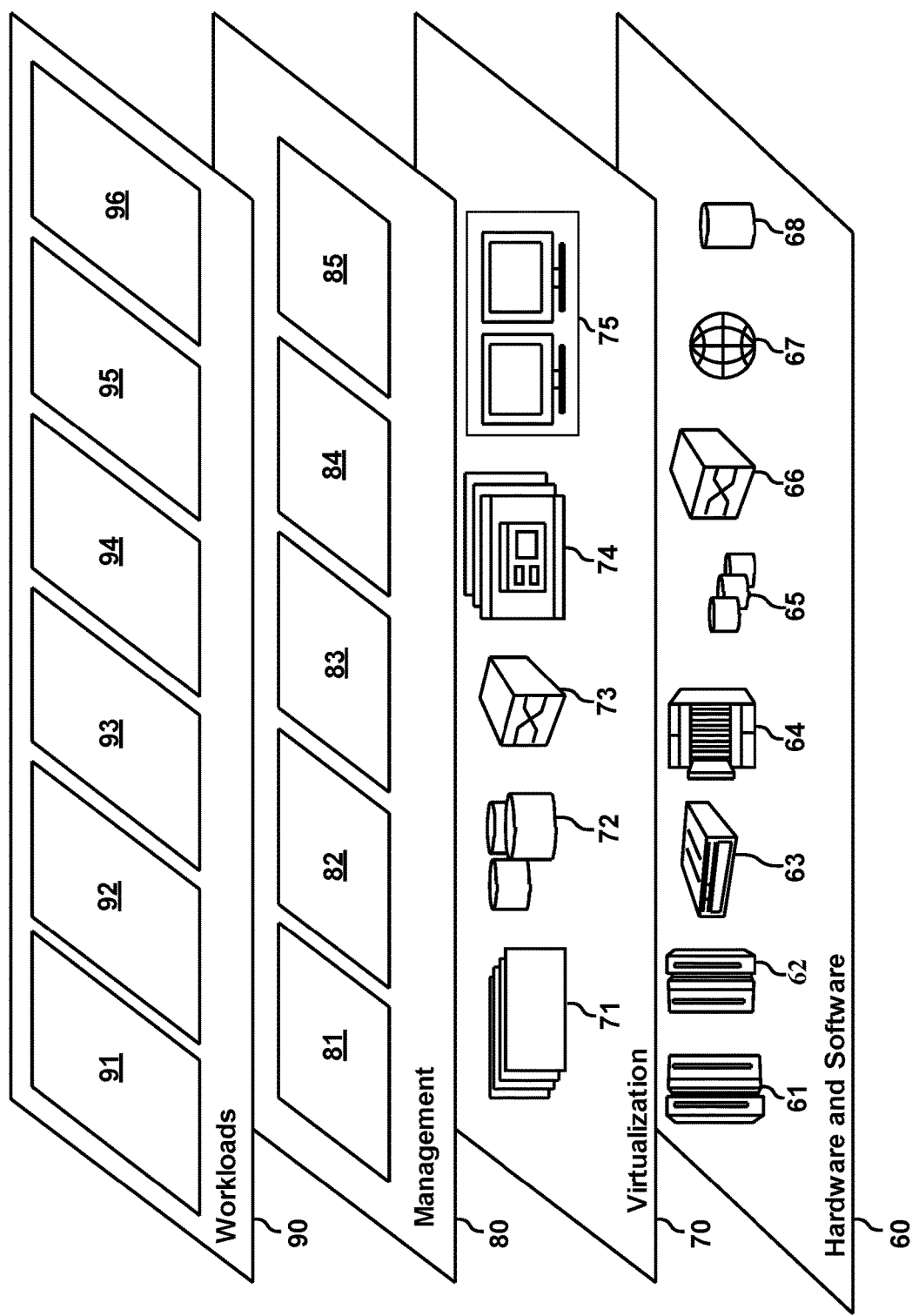
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic link object cross-AMODE sharing and supporting 96. In the following, the principle and structure of dynamic link object cross-AMODE sharing and supporting 96 will be described with references to FIG. 4-11.

Dynamic link objects, such as Dynamic link libraries (DLLs) or Dynamic Shared Objects (DSOs) are efficient tools to realize runtime modular. Instead of generating giant executable files that need to be rebuilt or test each time a change is made thereto, DLLs or DSOs allow generation of small executable files that need not be rebuilt if the change is contained within the DLLs or DSOs. In addition, dynamic link techniques using the dynamic link objects can save memory resource because, unlike the static link techniques which have linked the callee function instruction codes into the caller applications before mapping the caller applications into memory, dynamic link techniques postpone the linking and loading of the callee function until the runtime needs to execute the callee function instruction codes. Moreover, if the same DLL or DSO is referenced by different applications, only one instance of the DLL or DSO that can be shared by the different applications will be kept in the memory, which further avoids a waste of the memory space.

There are difficulties when the use of dynamic link techniques encounters different addressing modes. For example, there is a lack of a feasible mechanism that enables interoperating programs associated with different addressing modes, such as 32-bit and 64-bit programs, to use dynamic link techniques, including sharing information of the dynamic link objects and making a call to a function/variable of a dynamic link object associated with an addressing mode different from the caller program.

Example embodiments of the disclosure relate to, among other things, systems, methods, computer-readable media, techniques, and methodologies for sharing dynamic link objects between interoperating programs associated with different addressing modes and/or for supporting a cross addressing mode call to a dynamic link element in a dynamic link object.

The different addressing modes (AMODEs) may be referred to herein generically as AMODE M and AMODE N, where M and N are different values. For instance, in example embodiments, a program associated with addressing mode AMODE M may be a 31-bit or 32-bit program and a program associated with addressing mode AMODE N may be a 64-bit program, or vice versa. While example embodiments may be described with respect to 32-bit and 64-bit programs, it should be appreciated that the programs may be any N-bit and M-bit programs as long as N and M represent different values (i.e., different addressing modes). In addition, the term program as used herein encompasses any software application, program module, or more generally, computer-executable code configured to execute on a computer processor. Further, interoperating programs associated with different addressing modes may involve cross-AMODE function calls (i.e., calls between a caller and a callee associated with different addressing modes) including, without limitation, dynamic linkage function calls (e.g., where the caller and the callee are in different executables); static linkage function calls (e.g., where the caller and the callee are in the same executable); dynamic calls; and so forth. Still further, dynamic link objects as used herein includes any program modules, functions, or variables that as callees, are not linked and loaded until the execution of the callers. Examples of dynamic link objects may include, without limitation, DLL files/functions/variables or DSO files/functions/variables.

Recent years have seen the emergence of an increasing number of 64-bit programs, which provide better scalability and much larger memory addressability than 32-bit programs, for example. Further, more 64-bit programs are being written to leverage certain innovations only available with the 64-bit addressing mode. There remain, however, many 32-bit programs that continue to play a vital role in critical workloads. Thus, interaction between 32-bit programs and 64-bit programs is necessary to modernize the business logic of workloads, while at the same time, maintaining the viability of legacy 32-bit programs. However, as the migration from the 32-bit O/S to the 64-bit O/S takes some time, 64-bit programs and 32-bit programs will be seen to co-exist for a very long time. Problems will occur when a lower bit O/S is requested to handle execution of a higher bit program, because instructions of the higher bit program will not be recognized by a lower bit processor for the lower bit O/S.

There are various differences between different addressing modes that make interoperability between programs written in the different addressing modes difficult including, without limitation, different memory addressability capabilities (e.g., 4 gigabyte for a 32-bit addressing mode and 16 exabytes for a 64-bit addressing mode) and different linkage conventions that define how stack frames are managed and how parameters are passed. With respect to linkage convention differences, in a 64-bit program, for example, save areas and registers are twice as large as in a 32-bit program such that calling conventions for a 64-bit program take advantage of the additional register space to pass more arguments in registers. Further, 32-bit programs utilize a standard linkage convention (upward stack) while 64-bit programs utilize a different linkage convention (downward stack). In addition, different addressing mode programs run in different runtime environments with independent state information such as stack from state or control block state. Worse still, interoperability may not always be considered during initial 64-bit addressing mode design. Cross addressing mode interoperability may be needed to stay compatible with the existing 64-bit addressing mode support used by programming language for inter-language communication. Therefore, many issues are not only about how to cross addressing modes, but also related to how to cross linkage convention, cross runtime (especially stacks) and cross programing languages.

There are various existing approaches for supporting 32-bit and 64-bit interactions, each of which suffers from various technical drawbacks. For example, inter-process communication has been used but the overhead that it introduces contributes to poor performance. Moreover, redesign of the original application is required including additional development and testing which requires significant effort and can result in significant delay. In addition, each programming language has its own inter-process communication semantics which can result in issues for calls between different languages. Another existing approach for supporting 32-bit and 64-bit interactions is a remote call based on, for example, a RESTful Application Programming Interface (API). However, the performance associated with remote calls is even worse than with inter-process communication. Yet another existing approach is to recompile an application. For example, a 32-bit application can be recompiled as a 64-bit application. This approach, however, is an all-or-none approach that requires recompilation of all programs in an application, which can be a disruptive migration particularly for large enterprises. In addition, some languages still have no 64-bit support (e.g., Enterprise COBOL).

Further, it becomes more complicated and difficult if one of the interoperating programs associated with different addressing modes makes a request to load a dynamic link object. As previously mentioned, dynamic link involves linking at runtime and loading of one or more files, which requires support from the O/S because the distribution of virtual address space of a process is much more complex than that in the case of static link. As programs associated with different addressing modes run in independent different runtime environments, the programs loading the same dynamic link object are not capable of sharing information about the same dynamic link object in their respective runtime environments, which violates the original intention that dynamic link objects are designed to be shared among programs without a need to maintain multiple copies of the dynamic link objects in the virtual address space.

Still, there are also difficulties when a dynamic link element (e.g. a function or a variable) in a dynamic link object is referenced to or called by a program in a different addressing mode from the dynamic link object. For example, if a DLL has been written in 64-bit addressing mode, then generally after the compilation and linking, an exporting table that indicates names and address offsets of all the functions/variables to be exported from the DLL will also support only the 64-bit addressing mode. It will not be recognized by a 32-bit program and therefore, the 32-bit program cannot use the exported functions/variables of the DLL.

As a first aspect of the disclosure, example embodiments of the disclosure provide an methodology for sharing dynamic link objects between interoperating programs associated with different addressing modes that is based on allocating and utilizing a share area accessible to runtime environments for the interoperating programs to pass existing dynamic link object information.

As a second aspect of the disclosure, example embodiments of the disclosure provide an methodology for supporting a cross addressing mode call to a dynamic link element in a dynamic link object that is based on generating the dynamic link object comprising an exporting table for an original addressing mode of the dynamic link object and at least an addition exporting table for an additional addressing mode different from the original addressing mode, and selecting the appropriate exporting table according to the addressing mode of a caller program to determine an address offset of a dynamic link element in the process of resolution.

Any of these techniques in accordance with example embodiments of the disclosure represents a technical solution that addresses the aforementioned technical problems associated with existing approaches for supporting interaction across addressing modes, and enables dynamic link objects to be used by any of the interoperating programs associated with different addressing modes. In particular, a sharing technique in the first aspect of the present disclosure and/or a supporting technique in the second aspect of the present disclosure makes the dynamic link objects widely reused in multiple various large-scale applications. In addition, any of these techniques in accordance with example embodiments of the disclosure makes an application architect able to do effortlessly fit-for-purpose placement of the application without having to re-architect the application code. Still further, any of these techniques in accordance with example embodiments significantly reduces the effort for design, development and maintaining of applications.

Each of these technical improvements associated with any of these techniques in accordance with example embodiments constitutes technical effects of the disclosure that together represent an improvement in computer technology and the functioning of a computer. In particular, these technical improvements improve the functioning of a computer by allowing for flexible use of dynamic link objects by programs associated with different addressing modes.

The first respect of the present disclosure related to a method for sharing dynamic link object information between programs associated with different addressing modes will be described first.

Figure 4:
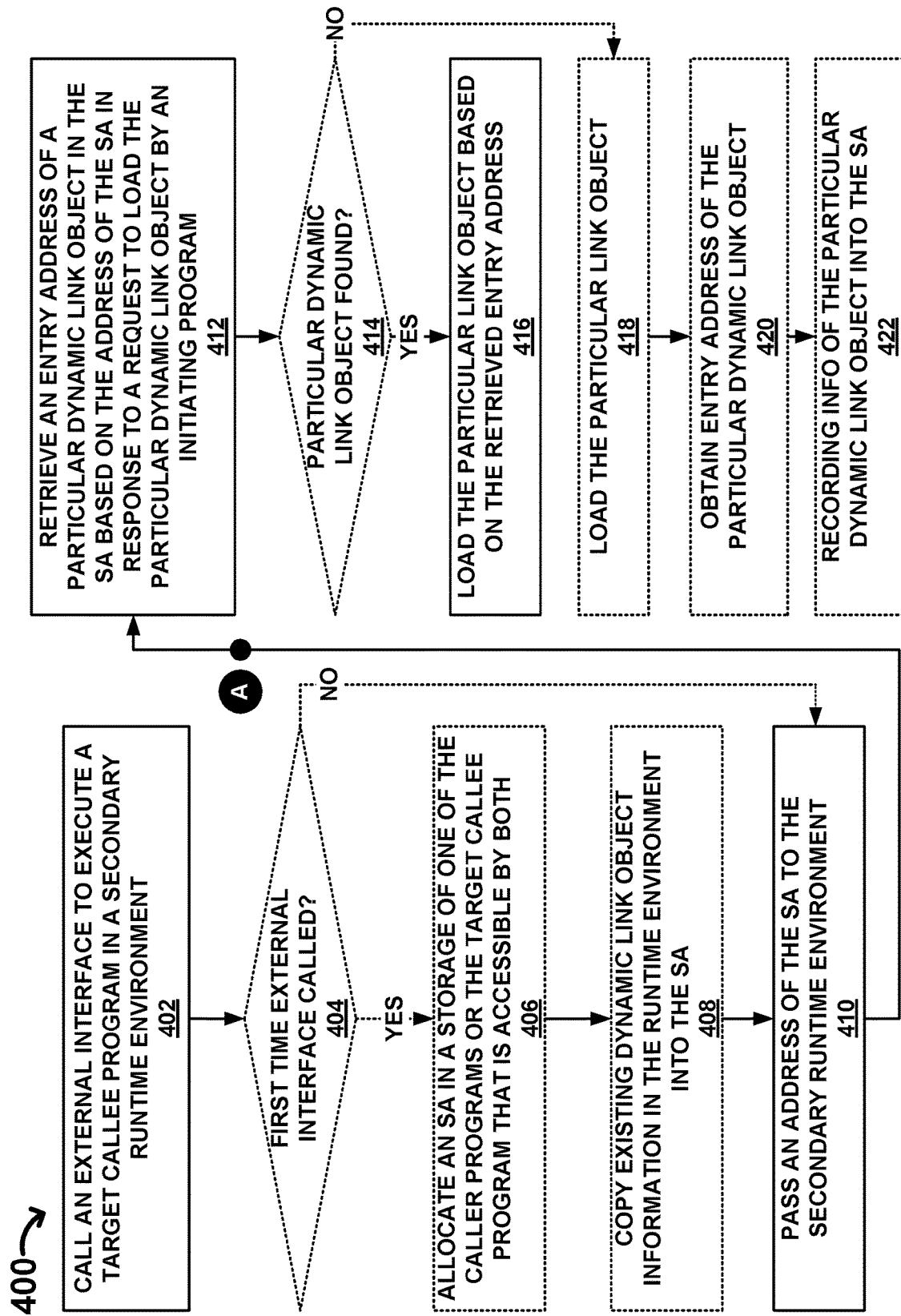
FIG. 4 is a process flow diagram of an illustrative method for sharing a dynamic link object between interoperating programs associated with different addressing modes according to an embodiment of the present disclosure.
Figure 6:
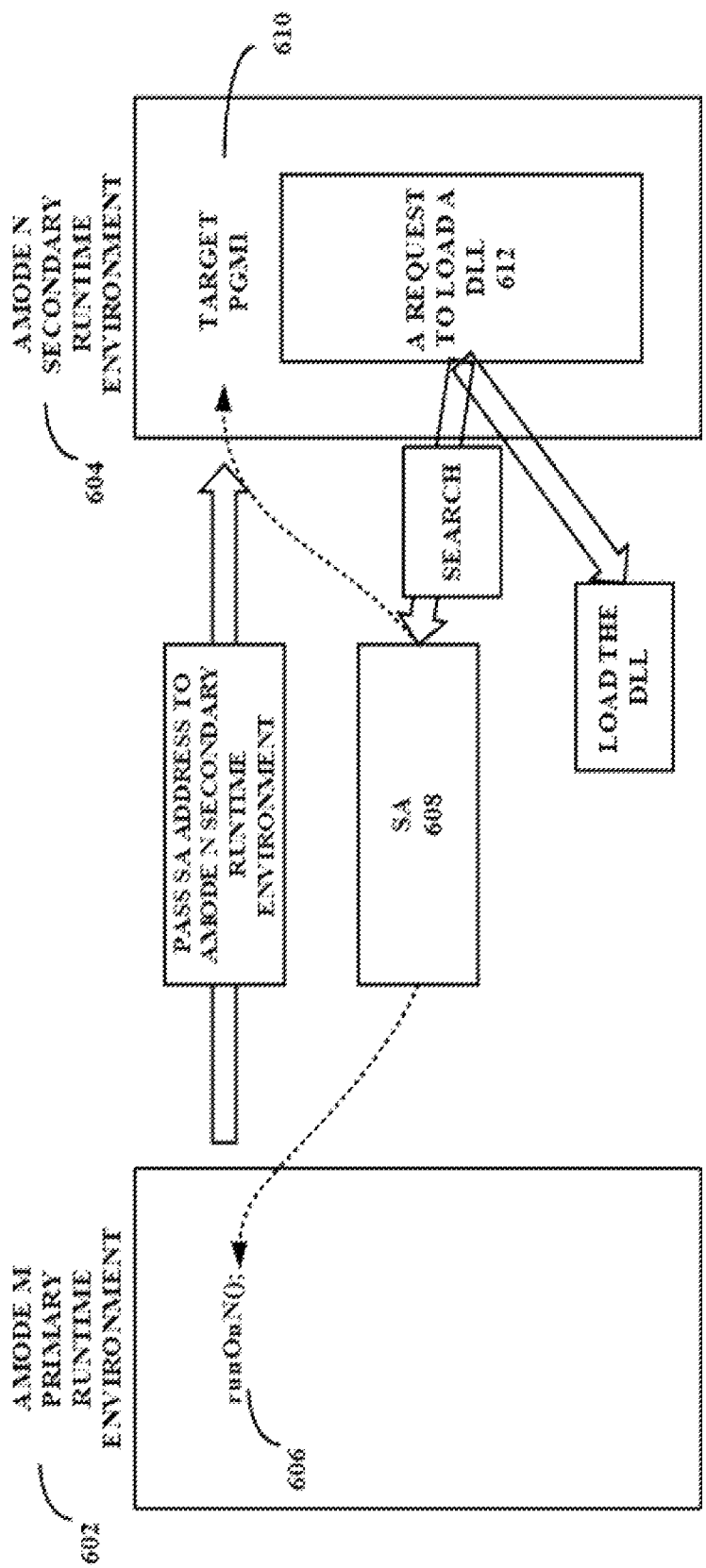
FIG. 6 is a schematic diagram illustrating an addressing mode (AMODE) M program invoking an AMODE N program that further involves a request to load a DLL in a single-threaded primary runtime environment according to an embodiment of the present disclosure.

FIG. 4 is a process flow diagram of an illustrative method 400 for sharing a dynamic link object between interoperating programs associated with different addressing modes. FIG. 6 is a schematic diagram illustrating an AMODE M program invoking an AMODE N program that further involves a request to load a DLL (as an example of dynamic link object) in a single-threaded primary runtime environment. FIG. 4 and FIG. 6 are described in conjunction with one another hereinafter.

Referring first to FIG. 6, in conjunction with FIG. 4, at block 402 of the method 400, in example embodiments, a caller program running within a primary runtime environment (AMODE M environment 602) makes a call to an external interface (runOnN( )606) to execute a target callee program (PGM1 610) in a secondary runtime environment (AMODE N environment 604). The interface may be "external" as used herein as a result of the interface being outside of the primary runtime environment and/or outside the computer the runtime environment is running on. In example embodiments, the caller program and the target callee program are associated with different addressing modes, e.g. the first addressing mode and the second addressing mode respectively. For instance, the caller program may be 32-bit and the target callee program may be 64-bit, or vice versa. Thus, in example embodiments, the external interface runOnN( ) may represent a call to an AMODE N program from an AMODE M program. Similarly, an external interface runOnM( ) (described in more detail later in this disclosure in reference to FIG. 7) may represent a call to an AMODE M program from an AMODE N program. The caller program may be any computer-executable code including, without limitation, an application, a compiler, a runtime library, or the like. The caller program may call the external interface runOnN( ) by providing the target program name (e.g. PGM1 610) and any associated parameters. The primary runtime environment is associated with the addressing mode of the caller program and the secondary runtime environment is associated with the addressing mode of the target callee program. As the addressing modes of the caller and target callee programs are different, the primary and secondary runtime environments are different.

At block 410 of the method 400, the external interface (runOnN( )606) may pass an address of a share area (SA) (SA 608) that stores existing dynamic link object information in the primary runtime environment (AMODE M environment 602) to the secondary runtime environment for executing the target callee program (PGM1 610). In example embodiments, the SA is a control block in a storage of one of the caller program or the target callee program that is capable of sharing dynamic link object information between different addressing mode runtime environments. To realize the sharing, the SA needs to be accessible by both the caller program and the target callee program. For example, accessible may mean a communication connection between the SA and the caller program. In example embodiments, the SA is placed in a storage of one of the caller program or the target callee program that has a more restrictive addressable storage than the other, so as to make sure that the SA is addressable by both the caller program and the target callee program. For instance, if in FIG. 6, M is larger than N, AMODE N PGM1 610 would have a more restrictive addressable storage than the AMODE M caller program, and thus SA 608 would be placed in a storage of PGM1 610. If M is smaller than N, SA 608 would be placed in a storage of the AMODE M caller program. If M equals to N, SA 608 would be placed in a storage of either the AMODE M caller program or the AMODE N PGM1 610. Accordingly, the address of the SA that is passed to the secondary runtime environment is accessible by both the primary and the secondary runtime environment.

In example embodiments, the existing dynamic link object information in the primary runtime environment that is stored in SA may include attribute information and addressing information of some or all of dynamic link objects already existing in the primary runtime environment. For example, the primary runtime environment may have previously loaded a dynamic link object prior to the execution of the call to the external interface, and the attribute information and addressing information of the previously loaded dynamic link object would be stored in the SA. Attribute information of a dynamic link object may refer to identification information of a dynamic link object that can be used to uniquely identify the dynamic link object, such as name of a dynamic link object. In example embodiments, the attribute information of a dynamic link object may further include AMODE of the dynamic link object, so that any program that requests to load the dynamic link object may select an appropriate AMODE version of the dynamic link object or perform some adaption work to load the dynamic link object even in a case that the AMODE of the dynamic link object is different from that of the requesting program. Addressing information of a dynamic link object may refer to entry address of the dynamic link object. In example embodiments, the addressing information of a dynamic link object may further include a length of the dynamic link object and/or an address of a static save area allocated by a runtime to the dynamic link object for storing external functions, parameters, and variables required by the dynamic link object.

Blocks 404-406 of the method 400 describes exemplary allocation and preparation of the SA. At block 404, the primary runtime environment may make a determination as to whether the call to the external interface (e.g. runOnN( )606) is a first call to the external interface. In example embodiments, in response to a positive determination at block 404, the primary runtime environment (AMODE M environment 602) allocates the SA at block 406, in a storage of the one of the caller program or the target callee program that is accessible by both the caller and the callee as mentioned above about where the SA is placed. Then, at block 408, the primary runtime environment copies the existing dynamic link object information in itself into the SA, and at block 410 the primary runtime environment passes the address of the allocated SA to the secondary runtime environment (AMODE N environment 604). On the other hand, in response to a negative determination at block 404 indicating that a call to the external interface has previously been made, and thus, that the SA has already been allocated and prepared with existing dynamic link object information, the address of the SA would be passed directly to the secondary runtime environment. In example embodiments, in response to receiving an instruction to terminate the primary runtime environment, the primary runtime environment may delete the dynamic link object information in the SA and release the SA.

The secondary runtime environment is generated for the execution of the target callee program associated with a different addressing mode from the caller program and the primary runtime environment. In example embodiments, the secondary runtime environment may be established by the primary runtime environment upon a call to the external interface for the first time. For example, the secondary runtime environment (e.g. AMODE N secondary runtime environment 604) may be established by the external interface (e.g. runOnN( )606) as mentioned at block 402 in response to a positive determination at block 404.

Next, at block 412 of the method 400, during execution of the target callee program in the secondary runtime environment and in response to a request to load a particular dynamic link object by an initiating program, a runtime environment of the initiating program may retrieve an entry address of the particular dynamic link object in the SA based on the address of the SA that is passed at block 410. The initiating program may be a program that initiates the request to load the particular dynamic link object and may be associated with either the first or second addressing mode. In example embodiments, the initiating program may be the target callee program (PGM1 610), and the runtime environment performing the search may be the secondary runtime environment (AMODE N environment 604). For instance, as depicted in FIG. 6, PGM1 610 initiates the request to load a DLL 612. In other example embodiments, the target callee program may further make a nested call to a second target callee program associated with the first addressing mode, and the initiating program may be the second target callee program. For instance, as will be described with reference to FIG. 7, PGM2 716, as the second target callee program, initiates the request to load a DLL 718. In such a case, the runtime environment of the initiating program would be the primary runtime environment. In example embodiments, to retrieve the entry address of the particular dynamic link object in the SA, the runtime environment of the initiating program may compare a name of the particular dynamic link object that is requested to be loaded with the names of the dynamic link objects recorded in the SA.

Next, at block 414 of the method 400, a determination may be made as to whether the particular dynamic link object has been found in the SA. At block 416 of the method 400, in response to a positive determination at block 414, which means that the entry address of the particular dynamic link object is retrieved from the SA, the entry address is returned to the runtime environment of the initiating program. Based on the entry address, at block 416, the runtime environment of the initiating program is able to load the particular dynamic link object. For example, if it is determined that a first dynamic link object recorded in the SA matches the particular dynamic link object (e.g. by name, or by name and other attribute information), it is thereby determined that the particular dynamic link object is found. Then the entry address of the first dynamic link object is returned and the particular dynamic link object is loaded based on the entry address of the first dynamic link object.

On the other hand, at block 418 of the method 400, in response to a negative determination at block 414 indicating that the particular dynamic link object has not been loaded by the primary runtime environment previously, the particular dynamic link object may be loaded by the runtime environment of the initiating program directly at block 418, the entry address of the particular dynamic link object is obtained from the loading at block 420 and information of the particular dynamic link object including the entry address may be recorded by the runtime environment of the initiating program into the SA at block 422. Notably, no matter whether the runtime environment of the initiating program is the primary runtime environment associated with the first addressing mode, or the secondary runtime environment associated with the second addressing mode, as described above, the SA is accessible to the runtime environment of the initiating program. Like the existing dynamic link object information copied into the SA, the recorded information of the particular dynamic link object may include attribute information (e.g. name, AMODE and the like) and addressing information (e.g. entry address, length, or an address of allocated static data area).

Figure 12:
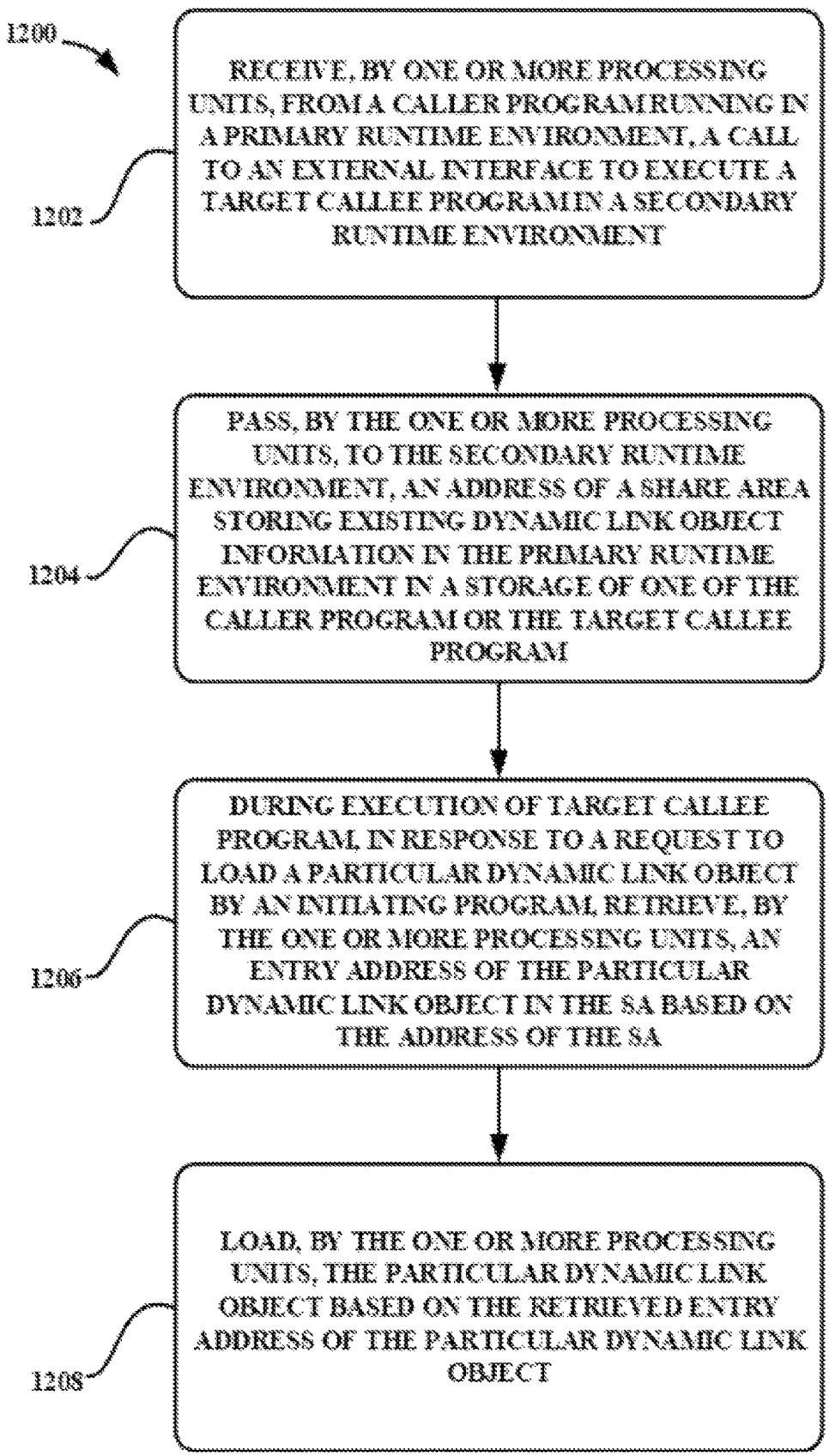
FIG. 12 is a process flow diagram of an illustrative method for sharing a dynamic link object between interoperating programs associated with different addressing modes according to an embodiment of the present disclosure.

It should be noted that not all of the blocks are necessary for the method 400. Some blocks such as those in dashed box may be omitted in some embodiments. Some blocks may be incorporated into/integrated with other blocks in some other embodiments. FIG. 12 is a process flow diagram of an illustrative method 1200 according to an embodiment of the present disclosure. Compared with method 400, method 1200 may be regarded as having omitted some optional operations or having incorporated some operations into the basic operations of blocks 1202-1208. The method 1200 may be implemented by a computer, such as the computer system/server 12 of FIG. 1.

At block 1202, a call to an external interface to execute a target callee program in a secondary runtime environment may be received by one or more processing units from a caller program running in a primary runtime environment. The caller program may be associated with a first addressing mode and the target callee program may be associated with a second addressing mode that is different from the first addressing mode. The one or more processing units may include the processing units/processors 16 of FIG. 1.

At block 1204, an address of a share area (SA) may be passed by the one or more processing units to the secondary runtime environment. The SA may store existing dynamic link object information in the primary runtime environment in a storage of one of the caller program or the target callee program. The SA may be accessible by both the caller program and the target callee program.

At block 1206, during execution of the target callee program in the secondary runtime environment, in response to a request to load a particular dynamic link object by an initiating program, an entry address of the particular dynamic link object may be retrieved by the one or more processing units in the SA based on the address of the SA.

At block 1208, the particular dynamic link object may be loaded by the one or more processing units based on the retrieved entry address of the particular dynamic link object.

Details of operations of blocks 1202-1208 can be referred to from the description of blocks 402, 410, 412 and 416 respectively, which are not repeated for conciseness.

As mentioned above, in example embodiments, the initiating program that initiates the request to load a particular dynamic link object may be the target callee program. In such a case, the caller program associated with the first addressing mode makes a non-nested call to the target callee program associated with the second addressing mode. It may be determined that there will be no more cross addressing mode calls in the secondary runtime environment from the target callee program, which means that the external interface would return control to the caller program upon return of control from the target callee program that has been executed. The schematic drawing of FIG. 6 is an example that depicts a non-nested call between AMODE M and AMODE N.

Figure 5:
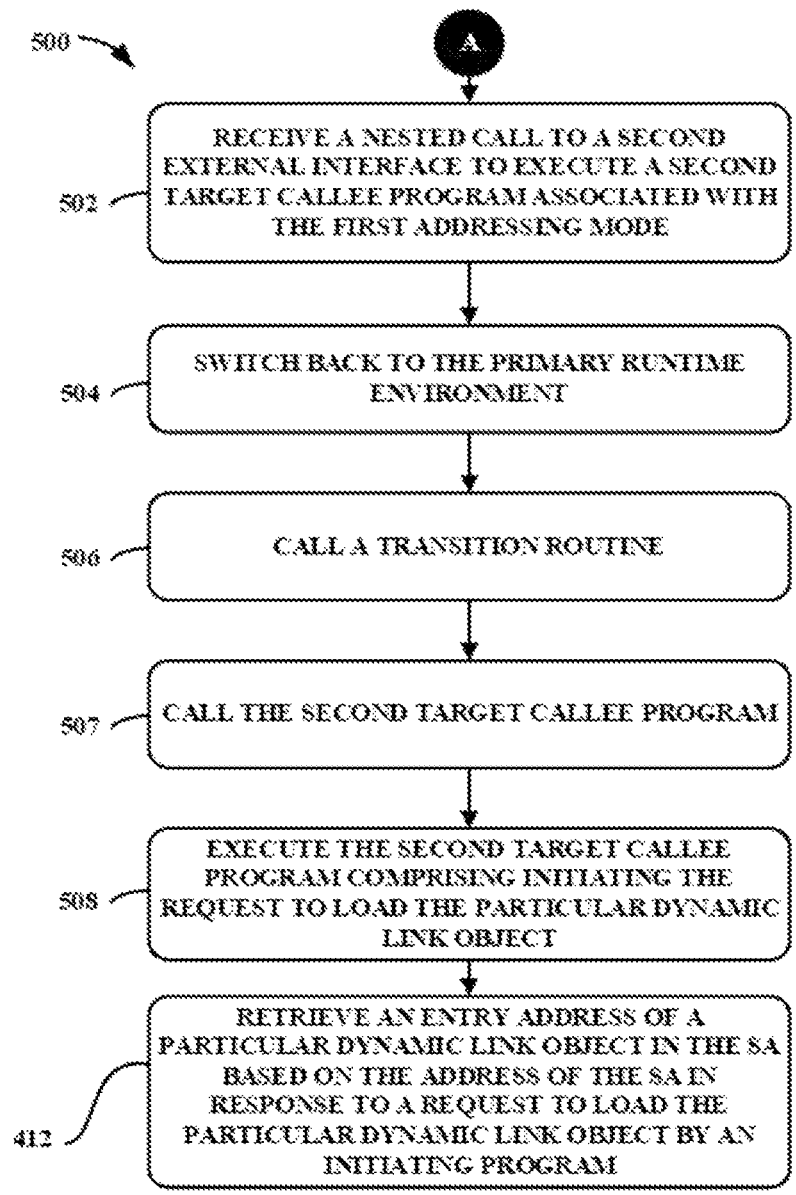
FIG. 5 is a process flow diagram for showing an illustrative method involving implementation of a nested call and transition of associated runtime environments according to an embodiment of the present disclosure.
Figure 7:
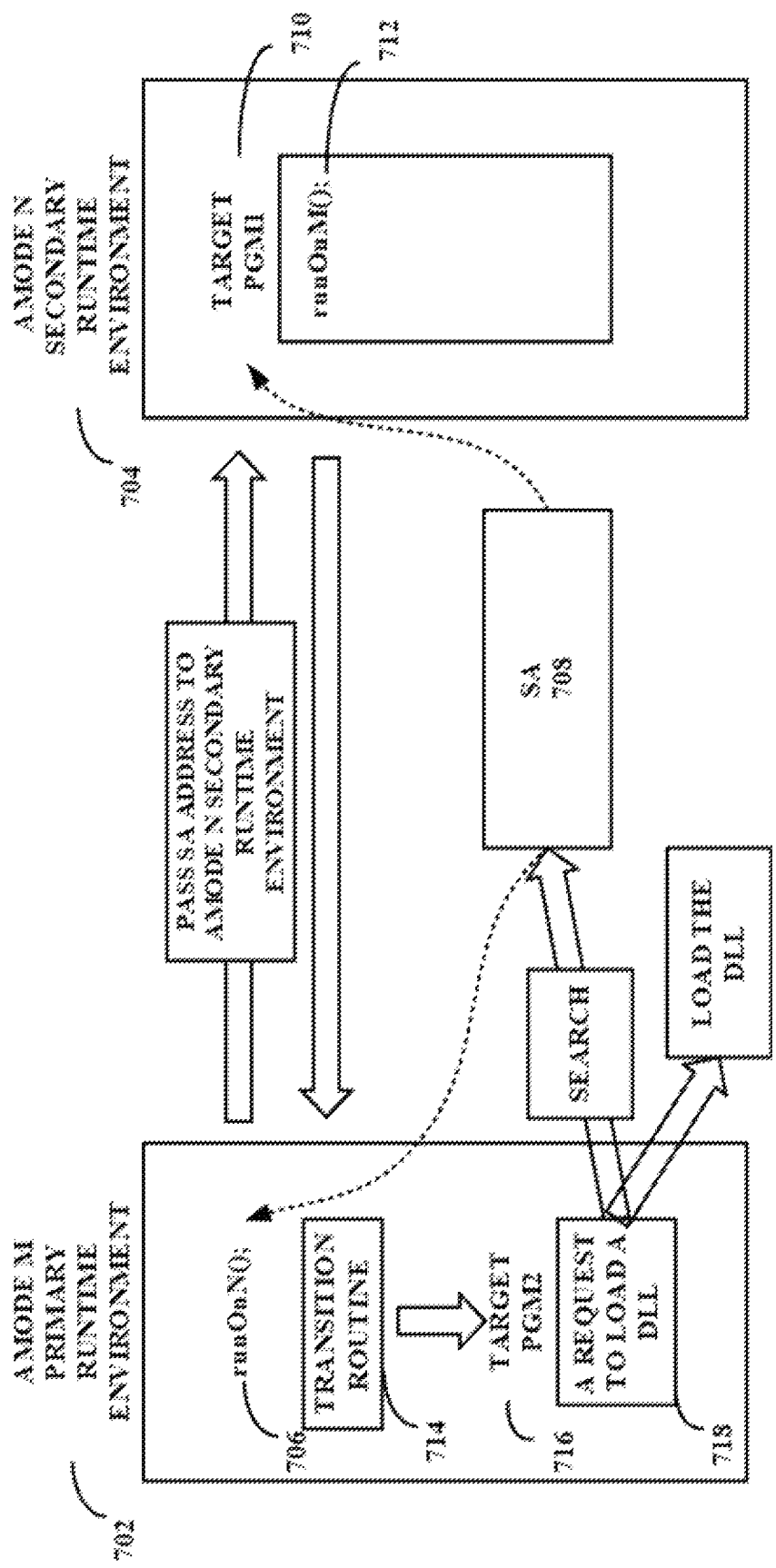
FIG. 7 is a schematic diagram illustrating a situation of nested calls between AMODE M and AMODE N and that the request to load a DLL is initiated by a second target callee program revoked by a nested call according to an embodiment of the present disclosure.

Further, in some example embodiments, the initiating program may be another target callee program that reverts to be associated with the primary runtime environment. In such a case, a nested call may be made by the target callee program to execute the other target callee program that involves a request to load a dynamic link object. FIG. 5 is a process flow diagram that is a supplement to the method 400 for showing an illustrative method 500 involving the implementation of the nested call and the transition of the associated runtime environments. FIG. 7 is a schematic diagram illustrating a situation of nested calls between AMODE M and AMODE N and the request to load a dynamic link object (e.g. a DLL) is initiated by the second target callee program revoked by a nested call. FIG. 5 and FIG. 7 are described in conjunction with one another hereinafter.

At block 502 of the method 500, which may be carried out at point A of the method 400 of FIG. 4, during execution of the target callee program in the secondary runtime environment, the target callee program (PGM1 710) running in the secondary runtime environment (AMODE N environment 704) may make a nested call to a second external interface (runOnM( )712) to execute a second target callee program (PGM2 716) associated with the first addressing mode. The second external interface (runOnM( )712) may check if the primary runtime environment (AMODE M environment 702) exists or not. If the primary runtime environment exists, unlike the first external interface (runOnN( )706), the second external interface may not pass the address of the SA, because the address has been known by both the primary runtime environment and the secondary runtime environment. Then the runtime environment would be switched from the secondary runtime environment to the primary runtime environment at block 504 of the method 500.

At block 506 of the method 500, a transition routine (transition routine 714) may be called. At block 507 of the method 500, in example embodiments, the transition routine may call the second target callee program (PGM2 716) using a linkage convention for the first addressing mode associated with the second target callee program. In example embodiments, the transition routine 212 is configured to handle parameter passing, stack manipulation, etc. for the first addressing mode.

At block 508 of the method 500, the second target callee program may be executed. As the second target callee program includes the request to load a particular dynamic link object, the execution of the second target callee program may initiate the request to load the particular dynamic link object. For example, as shown in FIG. 7, during execution of the PGM2 716, the request to load a DLL may be initiated. Then the method 500 continues to block 412 of the method 400 as shown in FIG. 4 including searching in the SA (SA 708).

Except for elements 712, 714 and 716, the remaining elements of the schematic drawing of FIG. 7 are similar to those of FIG. 6, and thus detailed description that is not made with reference to FIG. 7 can be referred to in the description of the equivalent elements in FIG. 6.

Figure 8:
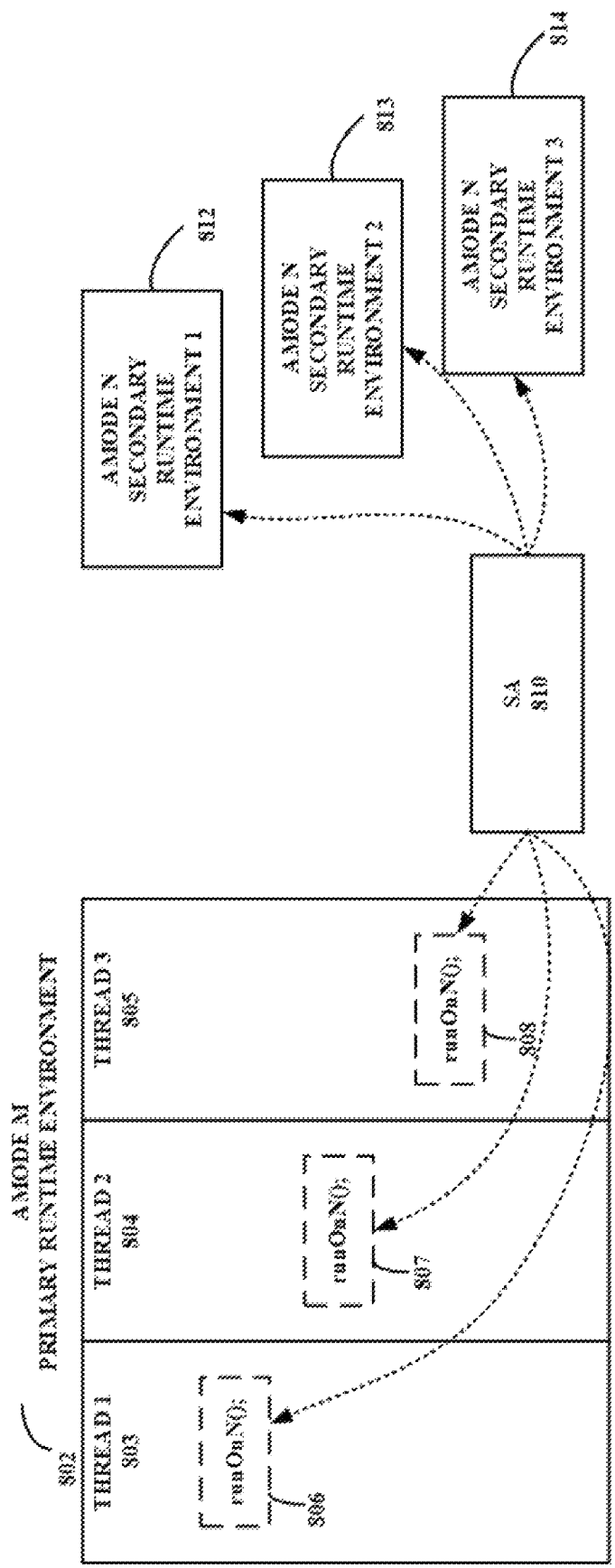
FIG. 8 is a schematic diagram illustrating a situation of multi-threaded runtime environment for a caller program according to an embodiment of the present disclosure.

The method for sharing dynamic link objects between programs associated with different addressing modes can not only be used in single-threaded use cases, such as those shown in FIG. 6-7, but can also be used in multi-threaded use cases. FIG. 8 is a schematic diagram illustrating a situation of multi-threaded runtime environment for the caller program.

As shown in FIG. 8, a caller program may create multiple threads, such as Thread 1 803, Thread 2 804 and Thread 3 805, in the AMODE M primary runtime environment 802. The method described above for sharing dynamic link object information between programs associated with different addressing modes (e.g. the method 400) may be performed for at least one of the multiple threads. In particular, when the caller program calls an external interface in a thread to execute a respective target callee program in a respective secondary runtime environment, an address of the SA that contains existing dynamic link object information in the AMODE M primary runtime environment 802 may be passed to the respective secondary runtime environment. Multiple threads (and thus the corresponding multiple secondary runtime environments) may share the same SA. For example, Thread 1 803, Thread 2 804 and Thread 3 805 are corresponding to AMODE N secondary runtime environment 1 812, AMODE N secondary runtime environment 2 813 and AMODE N secondary runtime environment 3 814, respectively. When either one of the external interfaces (runOnN( )806, runOnN( )807 and runOnN( )808) is called, it will pass an address of the SA 810 to a respective one of the secondary runtime environments 812, 813 and 814. As described above for the method 400, the first time call to the external interfaces in the execution of the caller program may trigger the allocation of the SA and the storing of the existing dynamic link object information into the SA. It should be noted that although FIG. 8 shows that the caller program has three threads and all of the three threads uses runOnN( ) to pass dynamic link object information, it is shown just for exemplary purpose and in other example embodiments, the caller program may have any number of threads and any number of the threads use the SA sharing method or share the same SA.

Aspects described above solve a problem that runtime environments associated with different addressing modes cannot share dynamic link information and would have to repeatedly load the same dynamic link object, which causes a great waste of storage in the memory. By using the SA to pass the existing dynamic link object information among different addressing modes, an entry address of the same dynamic link object, even if it has been previously loaded by a different addressing mode runtime environment can be reused, and thereby repeated loading of the same dynamic link object is avoided and memory storage could be saved.

A second respect of the present disclosure is related to a method for supporting cross addressing mode calls to dynamic link elements (e.g. functions or variables) in dynamic link objects. As discussed above, typically, a dynamic link object, such as a DLL or DSO file, is written in a particular addressing mode. A program associated with a different addressing mode is unable to reference or call any function or variable in the dynamic link object in the particular addressing mode. As a part of the second aspect of the present disclosure, to address this, the dynamic link object may be generated in a way to contain at least two exporting tables for different addressing modes, with one exporting table for the addressing mode that the dynamic link object is written and the rest of the exporting tables for other different addressing modes. Each of the exporting tables may indicate address offsets of dynamic link elements that can be exported from the particular dynamic link object. The address offsets may be relative to an entry address of the particular dynamic link object. The dynamic link elements may be functions and/or variables exportable by the particular dynamic link object and importable by external programs. With a dynamic link object generated in such a way, when a function or variable of the dynamic link object is called or referenced by a caller program, the runtime is able to resolve the function or variable by determining its address offset based on a exporting table corresponding to the addressing mode of the caller program, so as to execute the function or access the variable.

Figure 9:
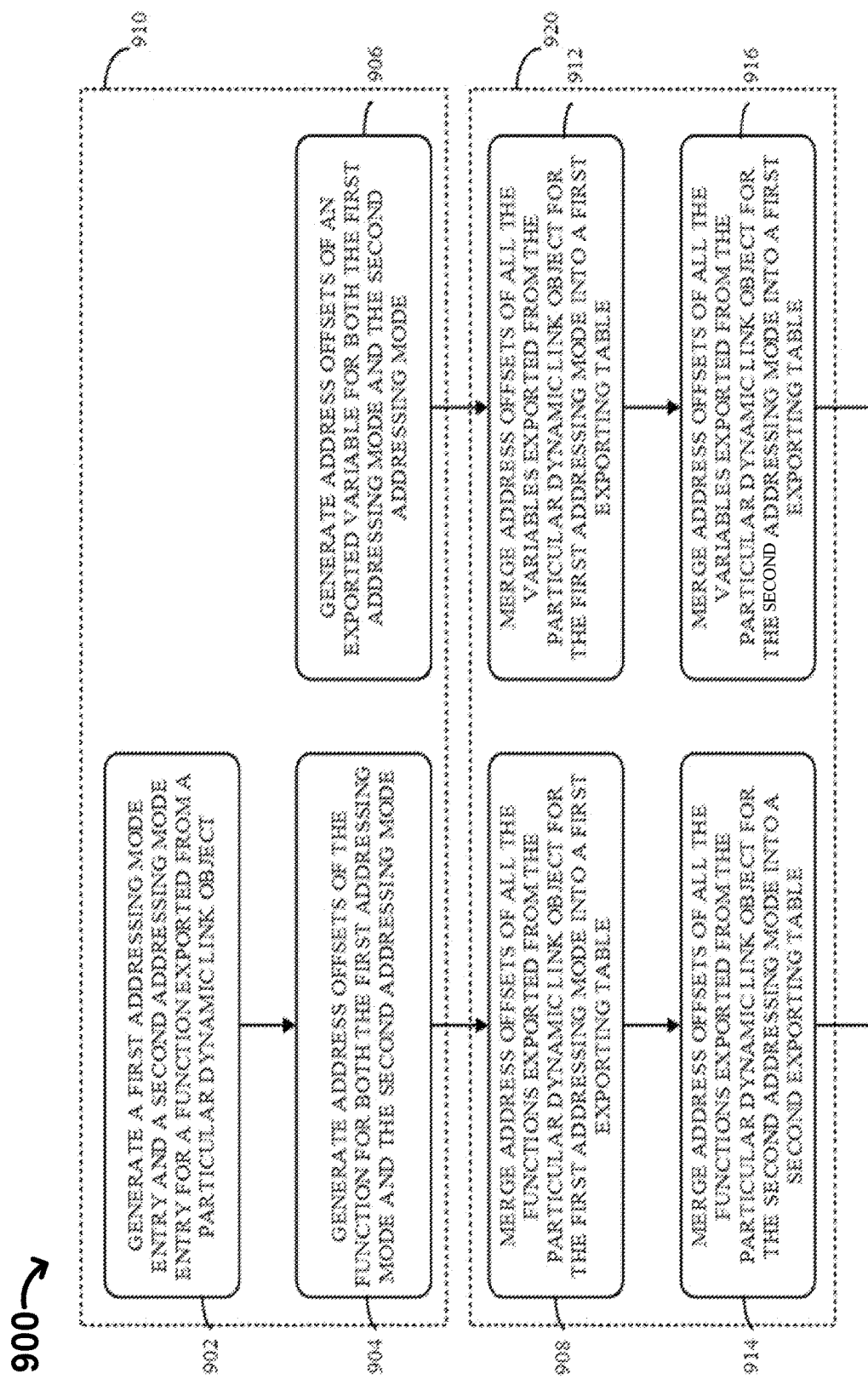
FIG. 9 is a process flow diagram that depicts a method for generating a dynamic link object that supports cross addressing mode calls to a function or variable therein according to an embodiment of the present disclosure.

FIG. 9 is a process flow diagram that depicts a method 900 for generating a particular dynamic link object that supports cross addressing mode calls to a function or variable therein. The method 400 may comprise a compiling process 910 and a linking process 920. The compiling process 910 may be performed by a compiler on a source file that specify the implementation instructions of the dynamic link object to generate an intermediate file. The linking process 920 may further involve linking a caller program to a callee dynamic link object.

At step 902 of the method 900, the compiler may generate a first addressing mode entry and a second addressing mode entry for a function exported from the particular dynamic link object. The first addressing mode entry, also referred to a function entry for the first addressing mode, is an entry of the function that is recognizable by a caller program associated with the first addressing mode, and the second addressing mode entry, also referred to as a function entry for the second addressing mode, is a different entry of the function that is recognizable by another caller program associated with the second addressing mode. In example embodiments, the particular dynamic link object may be associated with one of the first or second addressing mode, and the function entry for the other one of the first or second addressing mode may be generated based on the function entry for the one of the first or second addressing mode. For example, the particular dynamic link object may be written in the first addressing mode. In this case, the first addressing mode entry may be the same as normal (e.g., generated in a typical/standard way for the system/process, within a range of value of previous addressing mode entries, or a range selected by a user, etc.), and the second addressing mode entry may be generated based on the first addressing mode entry. Specifically, the second addressing mode entry may include a call to an external interface (e.g. runOnMOas described above if AMODE M is the first addressing mode) to execute a first program in a runtime environment associated with the first addressing mode, with the first program being pointed to the first addressing mode entry. Therefore, if a function exported from the particular dynamic link object written in the first addressing mode (e.g. AMODE M) is called/referenced by a caller program associated with the second addressing mode (e.g. AMODE N), the primary runtime environment of the caller program (such as AMODE N runtime environment 604 as shown in FIG. 6), which is also in the second addressing mode, would be directed to the second addressing mode entry of the function. Then, by executing the call to the external interface (e.g. runOnM( )), the primary runtime environment would establish and switch to a runtime environment associated with the first addressing mode, or directly switch to the runtime environment associated with the first addressing mode if the runtime environment associated with the first addressing mode has already been established (such as AMODE M runtime environment 602 as shown in FIG. 6). As such, the first program would be executed in the runtime environment associated with the first addressing mode. Since the first program is pointed to the first addressing mode entry, the execution of the first program would eventually lead to execution of the function at the first addressing mode entry in the first addressing mode runtime environment. As another example, the particular dynamic link object may be written in the second addressing mode. In this case, the second addressing mode entry may be the same as normal (e.g., generated in a typical/standard way for the system/process, within a range of value of previous addressing mode entries, or a range selected by a user, etc.), and the first addressing mode entry may be generated based on the second addressing mode entry. For instance, the first addressing mode entry may be generated by using the same approach as described above for generating the second addressing mode entry when the particular dynamic link object is written in the first addressing mode. Specifically, the first addressing mode entry may include a call to an external interface (e.g. runOnN( ) as described above if AMODE N is the second addressing mode) to execute a first program in a runtime environment associated with the second addressing mode, with the first program being pointed to the second addressing mode entry.

Figure 11:
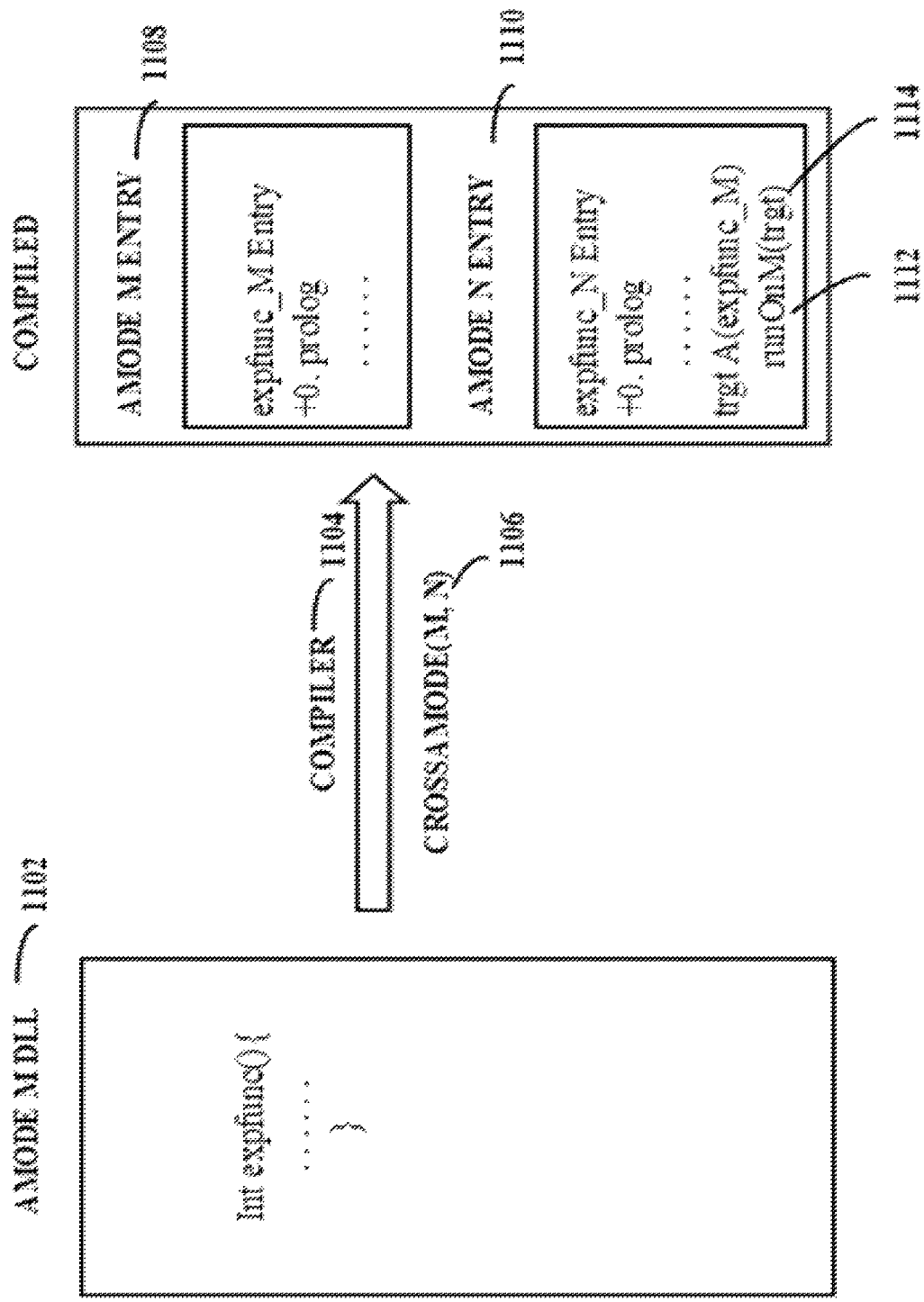
FIG. 11 is a schematic diagram showing an example of a compiling process according to an embodiment of the present disclosure.

FIG. 11 is a schematic diagram showing an example of the compiling process 910 of FIG. 9. Initially, a DLL file in AMODE M includes a function that is to be exported. After the compiler 1104 performs the compiling process with an option CrossAMODE (M, N) 1106 to indicate an intent for support of AMODE N calling of the functions in the DLL, the function to be exported has two entries, one for AMODE M (expfunc_M) and one for AMODE N. The AMODE M entry is the same as when a support for AMODE N calling is not desired. The AMODE N entry (expfunc_N) includes a call to runOnM( )1112 to execute a first program (trgt) 1114 in the AMODE M runtime environment. The first program (trgt) 1114 is pointed to the AMODE M entry (expfunc_M).

Returning to FIG. 9, at block 904 of the method 900, the compiler may generate address offsets for the function for both the first addressing mode and the second addressing mode. For example, if the first and second addressing mode are 64-bit addressing and 32-bit addressing respectively, the generated address offsets may include an address offset for 64-bit addressing and an address offset for 32-bit addressing. Similarly, at block 906 of the method 900, the compiler may generate address offsets of any or all exported variables for both the first addressing mode and the second addressing mode. The operation of blocks 902-904 may be performed repeatedly for each of the functions to be exported from the particular dynamic link object, and the operation of block 906 may be performed repeatedly for each of the variables to be exported from the particular dynamic link object.

Then in the linking process 920, at block 908, the linker may merge address offsets of all the functions exported from the particular dynamic link object for the first addressing mode into a first exporting table as it links all intermediate files into the final dynamic link object. The linker may also merge address offsets of all the functions exported from the particular dynamic link object for the second addressing mode into a second exporting table at block 914. In this way, a first exporting table including all the exported functions for the first addressing mode is generated and a second exporting table including all the exported functions for the second addressing mode is generated. The linker may perform similar operations for variables exported from the particular dynamic link object, including merging address offsets of variables for the first addressing mode into a first exporting table at block 912 and merging address offsets of variables for the second addressing mode into a second exporting table at block 916. A linker may be instructed to perform the operations 908-916 by inputting an option to indicate an intent for support both a first addressing mode call and a second addressing mode call, such as using CrossAMODE (M, N) option in FIG. 11 in the linker. With such an option as a input, in example embodiments, when linking a caller program to a function/variable in the particular dynamic link, the linker may check if the caller program is associated with one of the first or second addressing mode and the particular dynamic link object is associated with one of the first or second addressing mode. If it is found that the caller program or the particular dynamic link object is associated with other addressing mode than the first or second addressing modes, the linker would return an 'error' prompt. In example embodiments, the first/second exporting table for exported functions may be combined with the first/second exporting tables for exported variables so that there are only two exporting tables altogether, or the first/second exporting table for exported functions may be partially or completely separate from the first/second exporting tables for exported variables so that there are more than two exporting tables altogether. Finally, at point B, the particular dynamic link object is generated including a first exporting table for the first addressing mode and a second exporting table for the second addressing mode.

It should be recognized that the exporting table as used herein, either the first exporting table or the second exporting table, as would be commonly understood in the related art, refers to an organization of information indicated exporting functions/variables from a dynamic link object (such as DLLs or DSOs) that can be imported by other modules/functions/programs. It is usually implemented as a segment of codes at the beginning of the instruction codes of the dynamic link object. But it may also be implemented in other forms of data structure such as strings, lists, link tables, arrays and the like.

Figure 10:
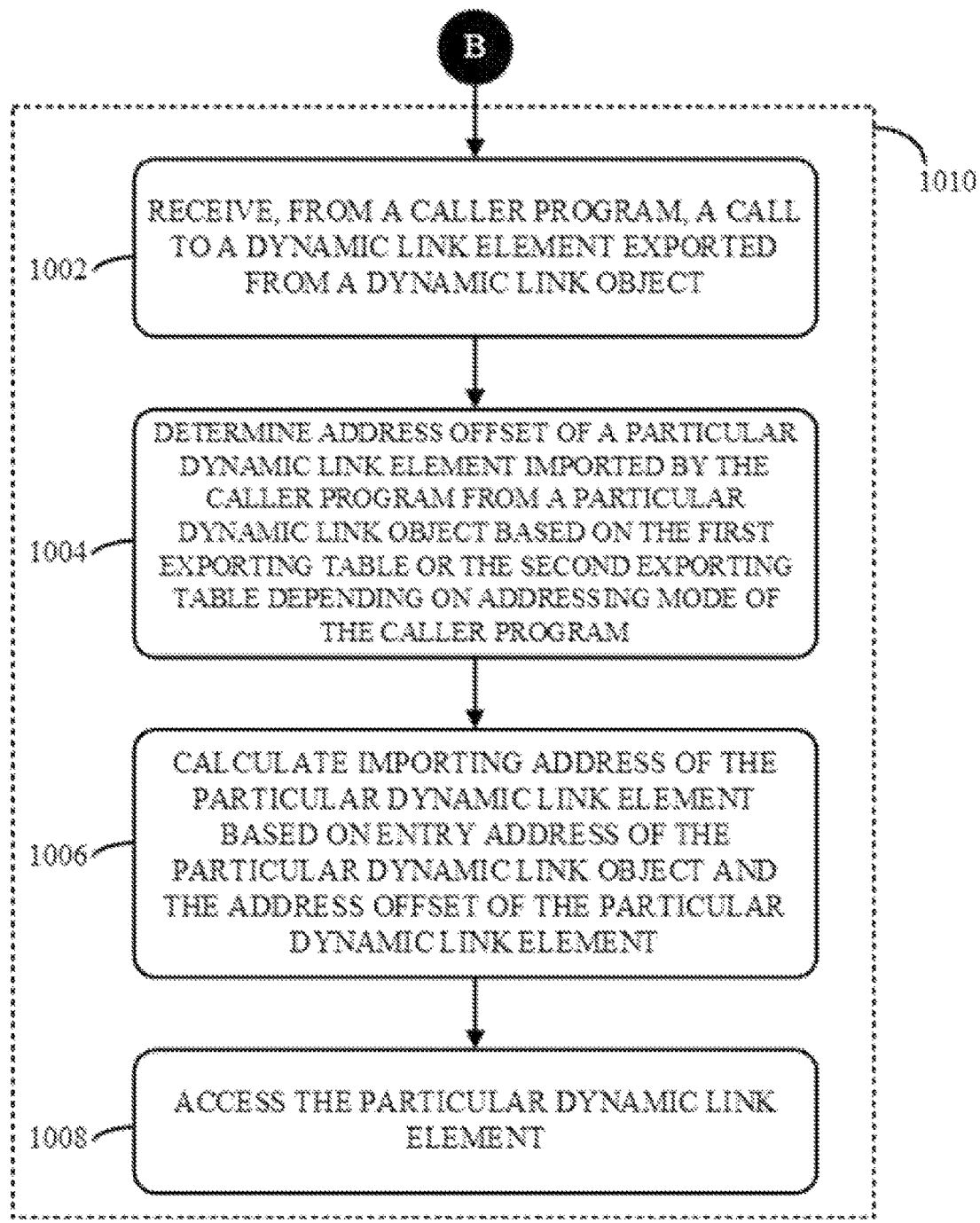
FIG. 10 is a process flow diagram that depicts a method for resolving a dynamic link element exported from a dynamic link object and referenced/called by a caller program that crosses addressing modes according to an embodiment of the present disclosure.

FIG. 10 is a process flow diagram that depicts a method 1000 for resolving a dynamic link element referenced/called by a caller program. The dynamic link element is exported from a dynamic link object that is generated with a support for cross addressing mode call (e.g. using the method 900).

At block 1002, a runtime environment of the caller program may receive a call to a dynamic link element exported from a dynamic link object. To successfully call the dynamic link element (e.g. call a function or access a variable), the caller program may need to load the dynamic link object first and may therefore involve initiate a request to load the dynamic link object. In this sense, the caller program may also be referred to as an initiating program. As mentioned above, the dynamic link object has been originally written in a first addressing mode and has been generated including the dynamic link element along with a first exporting table for the first addressing mode and a second exporting table for a second addressing mode, each indicating an address offset of the dynamic link element. In example embodiments, the dynamic link object may be generated using the method 900. In this regard, the method 1000 may start from point B in FIG. 9.

At block 1004, the runtime environment of the caller program may determine an address offset of a particular dynamic link element (e.g. a function or a variable) imported by the caller program from the dynamic link object based on the first exporting table or the second exporting table, depending on whether the caller program is associated with the first addressing mode or the second addressing mode. It may be determined by the runtime environment whether the caller program is associated with the first addressing mode or the second addressing mode. If the caller program is associated with the first addressing mode, the first exporting table that is generated for the first addressing mode may be used. If the caller program is associated with the second addressing mode, the second exporting table that is generated for the second addressing mode may be used.

At block 1006, the runtime environment of the caller program may calculate an importing address of the particular dynamic link element based on an entry address of the dynamic link object and the address offset of the particular dynamic link element that is determined at block 1004. The entry address of the dynamic link object is an address indicating where the dynamic link object has been or can be loaded. In some example embodiments, the entry address of the dynamic link object may be determined by directly loading the dynamic link object regardless of whether the same dynamic link object has previously been loaded. In other example embodiments, the entry address of the dynamic link object may be acquired by the runtime environment determining if the same dynamic link object has previously been loaded by it or other associated runtime environments and reusing the entry address of the same dynamic link object if it has been previously loaded. Specifically, the SA described herein as a first aspect of the disclosure that stores existing dynamic link object information and sharing the existing dynamic link object information to a couple of associated runtime environments may be utilized. The runtime environment of the caller program may perform the operations described in blocks 412-420 of FIG. 4. For instance, the runtime environment of the caller program may search in the SA for the dynamic link object for which the entry address is desired. If successfully finding the dynamic link object in the SA, the runtime environment of the caller program will reuse the entry address as recorded in the SA for the dynamic link object. Otherwise, the runtime environment of the caller program will also load the dynamic link object directly and record the entry address of the loaded dynamic link object into the SA to update the SA. The importing address may be calculated by adding the address offset determined at block 1004 to the entry address.

At block 1008, the runtime environment of the caller program may access the particular dynamic link element via the importing address that is calculated at block 1006. For instance, the runtime environment of the caller program may obtain the real address of a called function in a DLL file and execute the function, or obtain the real address of a variable and perform a read/write operation on the variable.

The second aspect of the present disclosure may be implemented independently of or in combination with the first aspect of the present disclosure. For instance, the two aspects may be combined in a way that: (1) the particular dynamic link object described in the method 400 may be a dynamic link object generated using the compiling and linking process described in the method 900; (2) the method 1000 may be performed successively to block 418 of the method 400 where the entry address of the particular dynamic link object has been obtained; and (3) the caller program in the method 1000 may be the initiating program at block 412 of the method 400 and the entry address of the particular dynamic link object at block 1006 may be the entry address obtained at block 418 of the method 400.

It should be noted that the processing of method 400, 500, 900, 1000 and 1200 according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

According to an embodiment of the present disclosure, there is provided a computer system. The computer system comprises a processor and a computer-readable memory coupled to the processor. The memory comprises instructions that when executed by the processor perform a method of receiving, from a caller program running in a primary runtime environment, a call to an external interface to execute a target callee program in a secondary runtime environment, wherein the caller program is associated with a first addressing mode and the target callee program is associated with a second addressing mode that is different from the first addressing mode. The memory further comprises instructions that when executed by the processor further perform a method of passing, to the secondary runtime environment, an address of a share area (SA) storing existing dynamic link object information in the primary runtime environment in a storage of one of the caller program or the target callee program, the SA being accessible by both the caller program and the target callee program. The memory further comprises instructions that when executed by the processor further perform a method of during execution of the target callee program in the secondary runtime environment, in response to a request to load a particular dynamic link object by an initiating program, retrieving an entry address of the particular dynamic link object in the SA based on the address of the SA. The memory further comprises instructions that when executed by the processor further perform a method of loading the particular dynamic link object based on the retrieved entry address of the particular dynamic link object.

According to an embodiment of the computer system, the a method of receiving the call to the external interface further comprising: in response to determining that the call to the external interface is a first call to the external interface: allocating, by the primary runtime environment, the SA in the storage of the one of the caller program or the target callee program; and copying, by the primary runtime environment, the existing dynamic link object information in the primary runtime environment into the SA.

According to an embodiment of the computer system, the a method of retrieving the entry address of the particular dynamic link object in the SA further comprising: in response to a determination that a first dynamic link object in the SA matches the particular dynamic link object, returning entry address of the first dynamic link object from the SA as the entry address of the particular dynamic link object.

According to an embodiment of the computer system, the memory further comprising instructions that when executed by the processor perform methods of: in response to a failure of retrieving the entry address of the particular dynamic link object in the SA: loading the particular dynamic link object; obtaining the entry address of the particular dynamic link object based on the loading of the particular dynamic link object; and recording information of the particular dynamic link object comprising the entry address in the SA.

According to an embodiment of the computer system, the memory further comprising instructions that when executed by the processor perform methods of: generating, by a compiler and a linker, a first exporting table indicating address offsets of dynamic link elements exported from the particular dynamic link object for the first addressing mode; generating, by the compiler and the linker, a second exporting table indicating address offsets of dynamic link elements exported from the particular dynamic link object for the second addressing mode; and generating, by the compiler and the linker, the particular dynamic link object comprising the first exporting table and the second exporting table.

According to an embodiment of the computer system, the memory further comprising instructions that when executed by the processor perform methods of: receiving, from the initiating program, a call to a particular dynamic link element exported from the particular dynamic link object; determining an address offset of a particular dynamic link element imported by the initiating program from the particular dynamic link object based on the first exporting table or the second exporting table depending on whether the initiating program is associated with the first addressing mode or the second addressing mode; calculating an importing address of the particular dynamic link element based on the entry address of the particular dynamic link object and the address offset of the particular dynamic link element; and accessing the particular dynamic link element via the importing address.

According to an embodiment of the present disclosure, there is provided a computer program product. The computer program product comprises a computer readable storage medium having program instructions embodied therewith. The program instructions are executable by a processor to cause the processor to receive, from a caller program running in a primary runtime environment, a call to an external interface to execute a target callee program in a secondary runtime environment, wherein the caller program is associated with a first addressing mode and the target callee program is associated with a second addressing mode that is different from the first addressing mode. The program instructions are executable by a processor to further cause the processor to pass, to the secondary runtime environment, an address of a share area (SA) storing existing dynamic link object information in the primary runtime environment in a storage of one of the caller program or the target callee program, the SA being accessible by both the caller program and the target callee program. The program instructions are executable by a processor to further cause the processor to, during execution of the target callee program in the secondary runtime environment, in response to a request to load a particular dynamic link object by an initiating program, retrieve an entry address of the particular dynamic link object in the SA based on the address of the SA. The program instructions are executable by a processor to further cause the processor to load the particular dynamic link object based on the retrieved entry address of the particular dynamic link object.

According to an embodiment of the computer program product, to receive the call to the external interface, the program instructions executable by the processor to cause the processor to: in response to determining that the call to the external interface is a first call to the external interface: allocate, by the primary runtime environment, the SA in the storage of the one of the caller program or the target callee program, and copy, by the primary runtime environment, the existing dynamic link object information in the primary runtime environment into the SA.

According to an embodiment of the computer program product, to retrieve the entry address of the particular dynamic link object in the SA, the program instructions executable by the processor to cause the processor to, in response to a determination that a first dynamic link object in the SA matches the particular dynamic link object, return entry address of the first dynamic link object from the SA as the entry address of the particular dynamic link object.

According to an embodiment of the computer program product, the program instructions executable by the processor to further causes the processor to: generate, by a compiler and a linker, a first exporting table indicating address offsets of dynamic link elements exported from the particular dynamic link object for the first addressing mode; generate, by the compiler and the linker, a second exporting table indicating address offsets of dynamic link elements exported from the particular dynamic link object for the second addressing mode; and generate, by the compiler and the linker, the particular dynamic link object comprising the first exporting table and the second exporting table.

According to an embodiment of the computer program product, the program instructions executable by the processor to cause the processor to receive, from the initiating program, a call to a particular dynamic link element exported from the particular dynamic link object, to determine an address offset of the particular dynamic link element imported by the initiating program from the particular dynamic link object based on the first exporting table or the second exporting table depending on whether the initiating program is associated with the first addressing mode or the second addressing mode, to calculate an importing address of the particular dynamic link element based on the entry address of the particular dynamic link object and the address offset of the particular dynamic link element, and to access the particular dynamic link element via the importing address.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language or the like, and procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, by one or more processing units, from a caller program running in a primary runtime environment, a call to an external interface to execute a target callee program in a secondary runtime environment, wherein the caller program is associated with a first addressing mode and the target callee program is associated with a second addressing mode that is different from the first addressing mode;
    passing, by the one or more processing units, to the secondary runtime environment, an address of a share area (SA) storing existing dynamic link object information in the primary runtime environment in a storage, the SA being accessible by both the caller program and the target callee program;
    during execution of the target callee program in the secondary runtime environment, in response to a request to load a particular dynamic link object by an initiating program, retrieving, by the one or more processing units, an entry address of the particular dynamic link object in the SA based on the address of the SA; and
    loading, by the one or more processing units, the particular dynamic link object into a runtime environment of the initiating program based on the retrieved entry address of the particular dynamic link object, wherein the runtime environment of the initiating program comprises the primary runtime environment or the secondary runtime environment.

2. The method of claim 1, the receiving the call to the external interface further comprising:
   in response to determining that the call to the external interface is a first call to the external interface:
   allocating, by the one or more processing units in the primary runtime environment, the SA in the storage, wherein the storage is selected from the group consisting of a storage of the caller program and a storage of the target callee program; and
   copying, by the one or more processing units in the primary runtime environment, the existing dynamic link object information in the primary runtime environment into the SA.

3. The method of claim 1, the retrieving the entry address of the particular dynamic link object in the SA further comprising:
   in response to a determination that a first dynamic link object in the SA matches the particular dynamic link object, returning, by the one or more processing units, an entry address of the first dynamic link object from the SA as the entry address of the particular dynamic link object.

4. The method of claim 1, further comprising:
   in response to a failure of retrieving the entry address of the particular dynamic link object in the SA:
   loading, by the one or more processing units, the particular dynamic link object;
   obtaining, by the one or more processing units, the entry address of the particular dynamic link object based on the loading of the particular dynamic link object; and
   recording, by the one or more processing units, information of the particular dynamic link object comprising the entry address in the SA.

5. The method of claim 1, further comprising:
   generating, by a compiler and a linker, a first exporting table indicating address offsets of dynamic link elements exported from the particular dynamic link object for the first addressing mode;
   generating, by the compiler and the linker, a second exporting table indicating address offsets of dynamic link elements exported from the particular dynamic link object for the second addressing mode; and
   generating, by the compiler and the linker, the particular dynamic link object comprising the first exporting table and the second exporting table.

6. The method of claim 5, the generating the first exporting table further comprising:
   for each of functions exported from the particular dynamic link object:
   generating, by the compiler, a first address offset for the first addressing mode; and
   merging, by the linker, first address offsets of all the functions exported from the particular dynamic link object for the first addressing mode into the first exporting table, and
   the generating the second exporting table further comprising:
   for each of functions exported from the particular dynamic link object:
   generating, by the compiler, a second address offset for the second addressing mode; and
   merging, by the linker, second address offsets of all the functions exported from the particular dynamic link object for the second addressing mode into the second exporting table.

7. The method of claim 5, the generating the first exporting table further comprising:
   for each of variables exported from the particular dynamic link object:
   generating, by the compiler, a first address offset for the first addressing mode; and
   merging, by the linker, first address offsets of all the variables exported from the particular dynamic link object for the first addressing mode into the first exporting table, and
   the generating the second exporting table further comprising:
   for each of variables exported from the particular dynamic link object:
   generating, by the compiler, a second address offset for the second addressing mode; and
   merging, by the linker, second address offsets of all the variables exported from the particular dynamic link object for the second addressing mode into the second exporting table.

8. The method of claim 5, further comprising:
   generating, by the compiler and for each of functions exported from the particular dynamic link object, a function entry for the first addressing mode and a function entry for the second addressing mode in the particular dynamic link object,
   wherein the particular dynamic link object is associated with one of the first addressing mode or the second addressing mode, and the function entry for the other one of the first addressing mode or the second addressing mode is generated based on the function entry for the one of the first addressing mode or the second addressing mode.

9. The method of claim 5, further comprising:
   receiving, from the initiating program, a call to a particular dynamic link element exported from the particular dynamic link object;
   determining an address offset of the particular dynamic link element imported by the initiating program from the particular dynamic link object based on the first exporting table or the second exporting table depending on whether the initiating program is associated with the first addressing mode or the second addressing mode;
   calculating an importing address of the particular dynamic link element based on the entry address of the particular dynamic link object and the address offset of the particular dynamic link element; and
   accessing the particular dynamic link element via the importing address.

10. A computer system comprising:
    a processor; and
    a computer-readable memory coupled to the processor, the memory comprising instructions that when executed by the processor perform methods of:
    receiving, from a caller program running in a primary runtime environment, a call to an external interface to execute a target callee program in a secondary runtime environment, wherein the caller program is associated with a first addressing mode and the target callee program is associated with a second addressing mode that is different from the first addressing mode;
    passing, to the secondary runtime environment, an address of a share area (SA) storing existing dynamic link object information in the primary runtime environment in a storage, the SA being accessible by both the caller program and the target callee program;

during execution of the target callee program in the secondary runtime environment, in response to a request to load a particular dynamic link object by an initiating program, retrieving an entry address of the particular dynamic link object in the SA based on the address of the SA; and loading the particular dynamic link object into a runtime environment of the initiating program based on the retrieved entry address of the particular dynamic link object, wherein the runtime environment of the initiating program comprises the primary runtime environment or the secondary runtime environment.

11. The computer system of claim 10, to perform the method of receiving the call to the external interface, the memory further comprising instructions that when executed by the processor perform methods of:

in response to determining that the call to the external interface is a first call to the external interface:
allocating, by the one or more processing units in the primary runtime environment, the SA in the storage, wherein the storage is selected from the group consisting of a storage of the caller program and a storage of the target callee program; and
copying, by the primary runtime environment, the existing dynamic link object information in the primary runtime environment into the SA.

12. The computer system of claim 10, to perform the method of retrieving the entry address of the particular dynamic link object in the SA, the memory further comprising instructions that when executed by the processor perform methods of:

in response to a determination that a first dynamic link object in the SA matches the particular dynamic link object, returning an entry address of the first dynamic link object from the SA as the entry address of the particular dynamic link object.

13. The computer system of claim 10, the memory further comprising instructions that when executed by the processor perform methods of:

in response to a failure of retrieving the entry address of the particular dynamic link object in the SA:
loading the particular dynamic link object;
obtaining the entry address of the particular dynamic link object based on the loading of the particular dynamic link object; and
recording information of the particular dynamic link object comprising the entry address in the SA.

14. The computer system of claim 10, the memory further comprising instructions that when executed by the processor perform methods of:

generating, by a compiler and a linker, a first exporting table indicating address offsets of dynamic link elements exported from the particular dynamic link object for the first addressing mode;
generating, by the compiler and the linker, a second exporting table indicating address offsets of dynamic link elements exported from the particular dynamic link object for the second addressing mode; and
generating, by the compiler and the linker, the particular dynamic link object comprising the first exporting table and the second exporting table.

15. The computer system of claim 14, the memory further comprising instructions that when executed by the processor perform methods of:

receiving, from the initiating program, a call to a particular dynamic link element exported from the particular dynamic link object;

determining an address offset of a particular dynamic link element imported by the initiating program from the particular dynamic link object based on the first exporting table or the second exporting table depending on whether the initiating program is associated with the first addressing mode or the second addressing mode;
calculating an importing address of the particular dynamic link element based on the entry address of the particular dynamic link object and the address offset of the particular dynamic link element; and
accessing the particular dynamic link element via the importing address.

16. A computer program product, comprising a computer readable storage medium having program instructions embodied therewith, the program instructions executable by a processor to cause the processor to:

receive, from a caller program running in a primary runtime environment, a call to an external interface to execute a target callee program in a secondary runtime environment, wherein the caller program is associated with a first addressing mode and the target callee program is associated with a second addressing mode that is different from the first addressing mode;
pass, to the secondary runtime environment, an address of a share area (SA) storing existing dynamic link object information in the primary runtime environment in a storage, the SA being accessible by both the caller program and the target callee program;
during execution of the target callee program in the secondary runtime environment, in response to a request to load a particular dynamic link object by an initiating program, retrieve an entry address of the particular dynamic link object in the SA based on the address of the SA; and
load the particular dynamic link object into a runtime environment of the initiating program based on the retrieved entry address of the particular dynamic link object wherein the runtime environment of the initiating program comprises the primary runtime environment or the secondary runtime environment.

17. The computer program product of claim 16, to receive the call to the external interface, the program instructions executable by the processor to further causes the processor to:

in response to determining that the call to the external interface is a first call to the external interface:
allocate, by the primary runtime environment, the SA in the storage of the one of the caller program or the target callee program; and
copy, by the primary runtime environment, the existing dynamic link object information in the primary runtime environment into the SA.

18. The computer program product of claim 16, to retrieve the entry address of the particular dynamic link object in the SA, the program instructions executable by the processor to further causes the processor to:

in response to a determination that a first dynamic link object in the SA matches the particular dynamic link object, return an entry address of the first dynamic link object from the SA as the entry address of the particular dynamic link object.

19. The computer program product of claim 16, the program instructions executable by the processor to further causes the processor to:

generate, by a compiler and a linker, a first exporting table indicating address offsets of dynamic link elements exported from the particular dynamic link object for the first addressing mode;

generate, by the compiler and the linker, a second exporting table indicating address offsets of dynamic link elements exported from the particular dynamic link object for the second addressing mode; and generate, by the compiler and the linker, the particular dynamic link object comprising the first exporting table and the second exporting table.

20. The computer program product of claim 19, the program instructions executable by the processor to further causes the processor to:

receive, from the initiating program, a call to a particular dynamic link element exported from the particular dynamic link object;

determine an address offset of the particular dynamic link element imported by the initiating program from the particular dynamic link object based on the first exporting table or the second exporting table depending on whether the initiating program is associated with the first addressing mode or the second addressing mode;

calculate an importing address of the particular dynamic link element based on the entry address of the particular dynamic link object and the address offset of the particular dynamic link element; and access the particular dynamic link element via the importing address.

* * * * *